Dec. 11, 1951 W. S. WATTS ET AL 2,577,830
COMBINED ROAD AND RAIL VEHICLE
Filed July 15, 1944 6 Sheets-Sheet 1
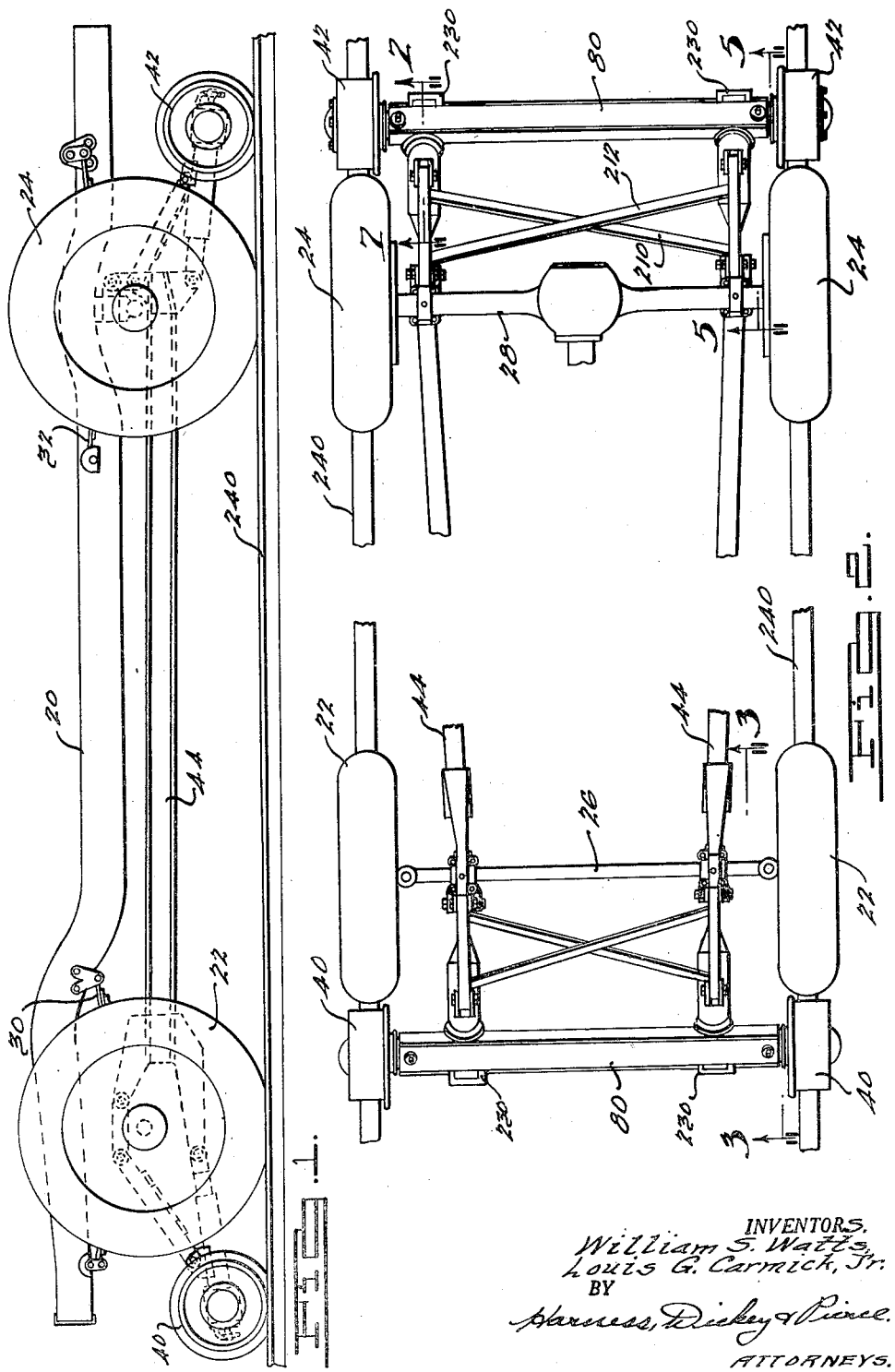
INVENTORS.
William S. Watts,
Louis G. Carmick, Jr.
BY
Harness, Dickey & Pierce.
ATTORNEYS.

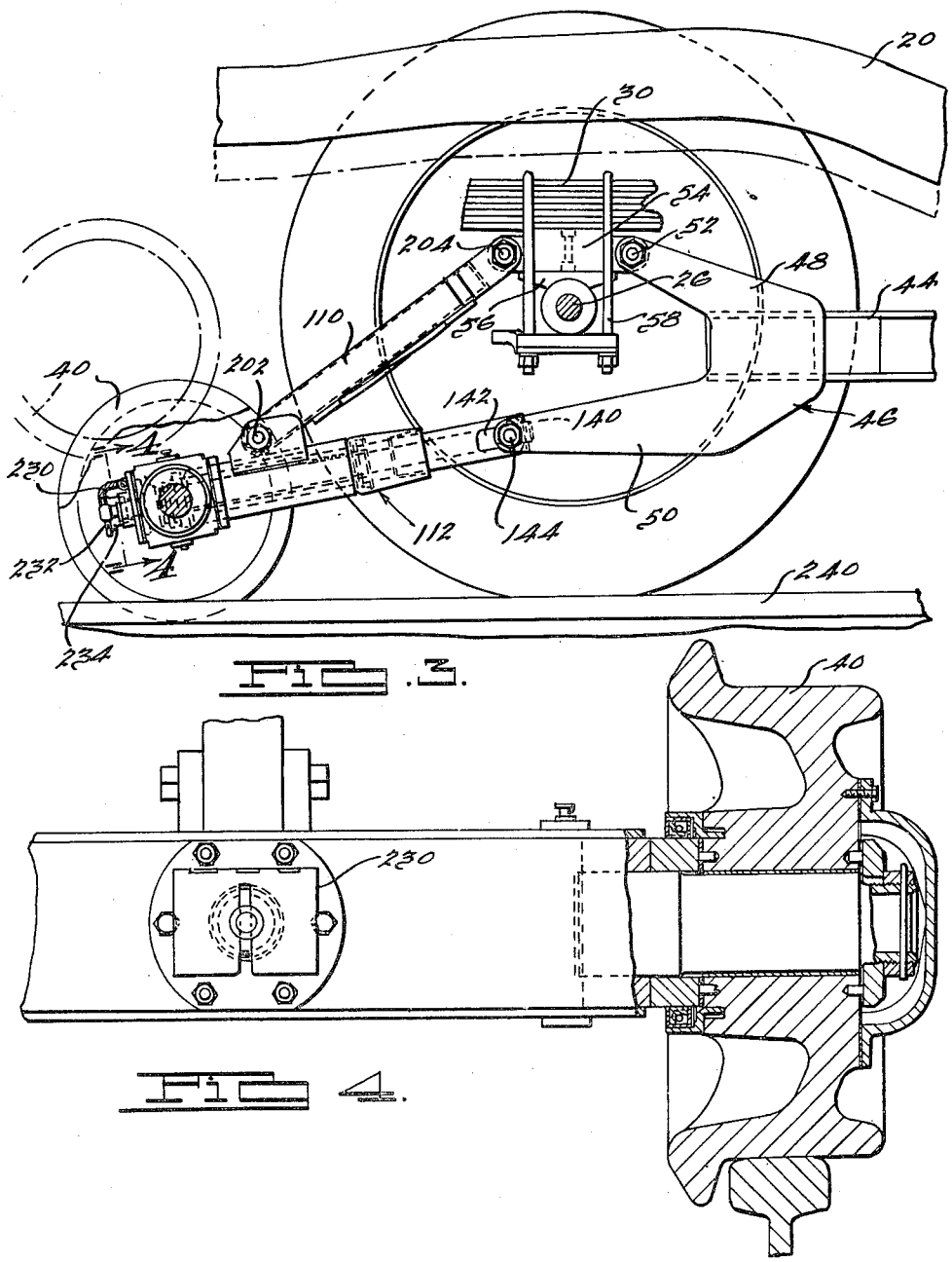

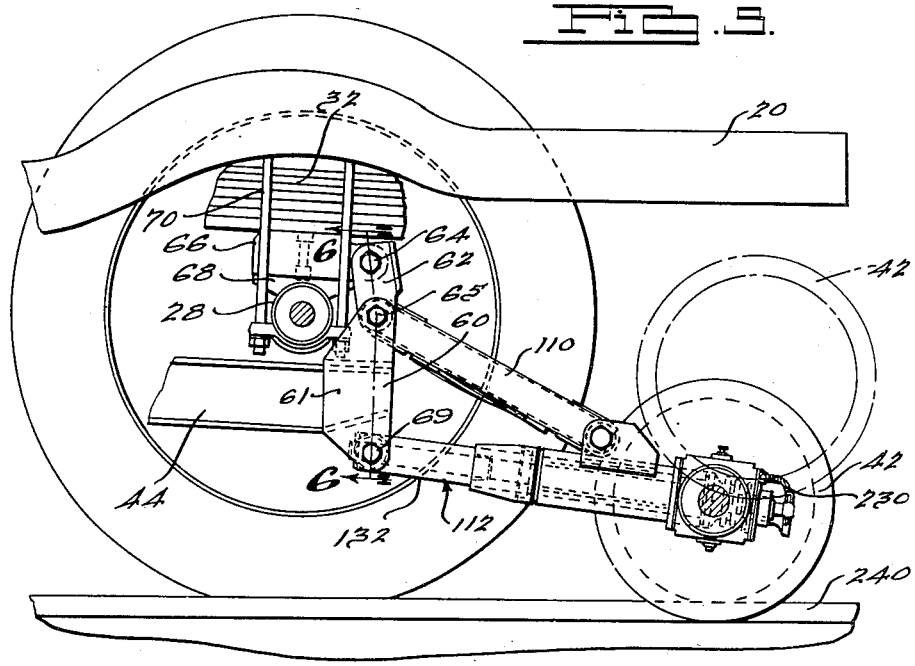
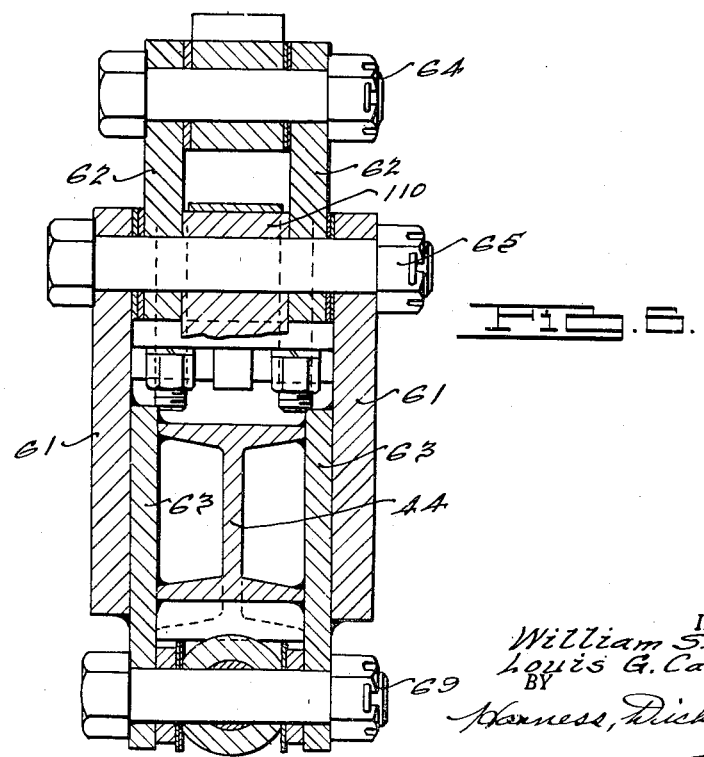

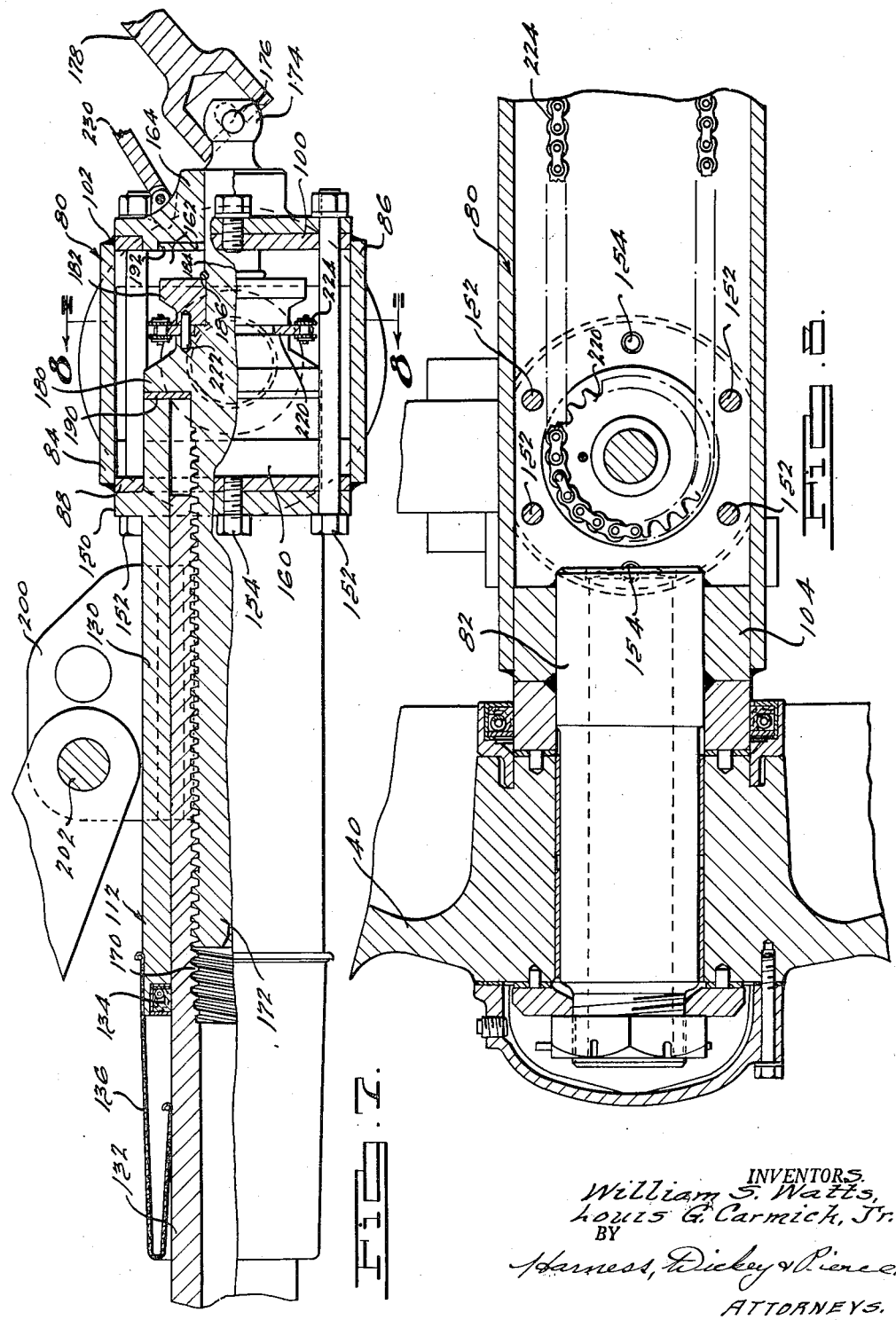

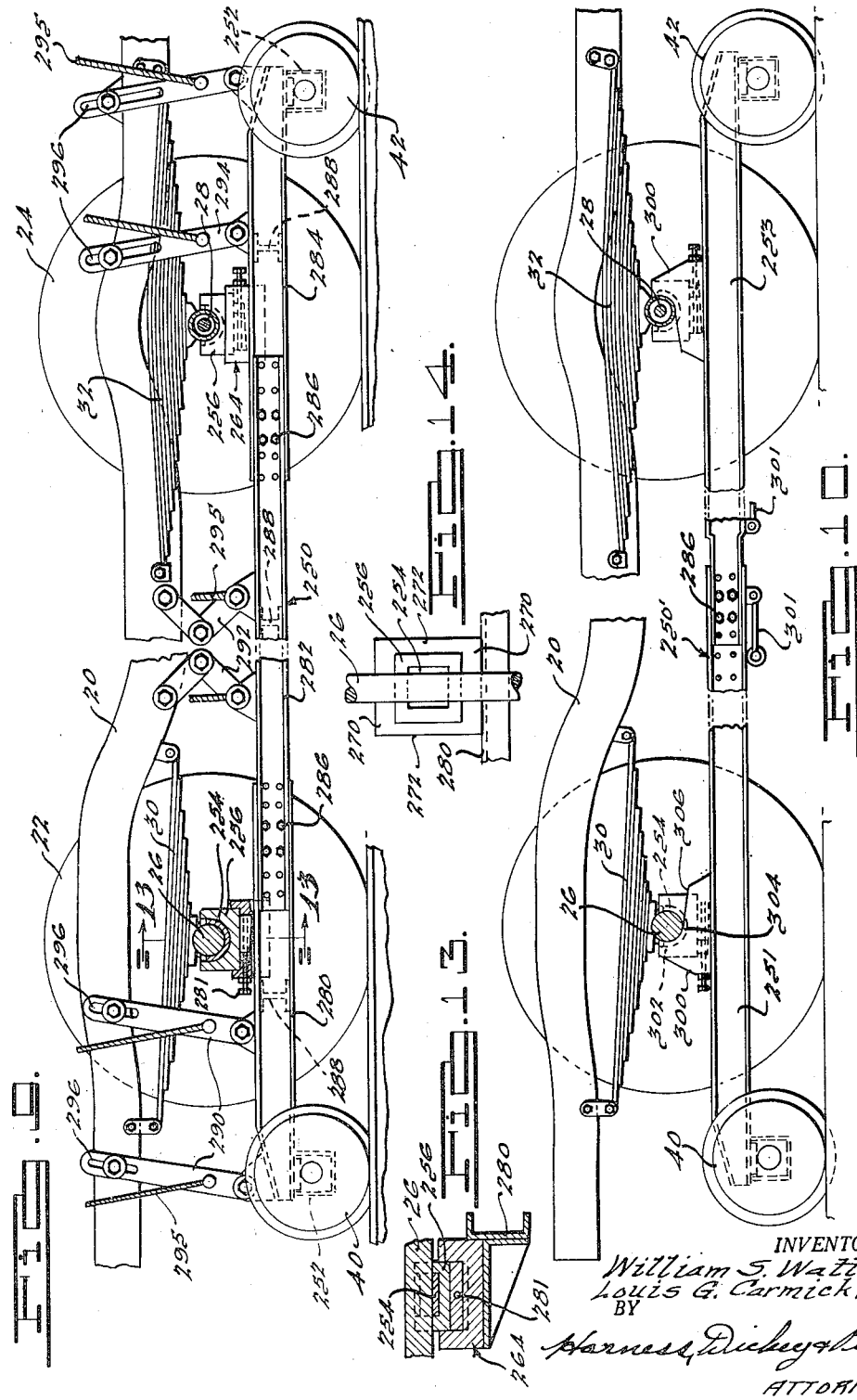

Dec. 11, 1951  W. S. WATTS ET AL  2,577,830
COMBINED ROAD AND RAIL VEHICLE
Filed July 15, 1944  6 Sheets-Sheet 6
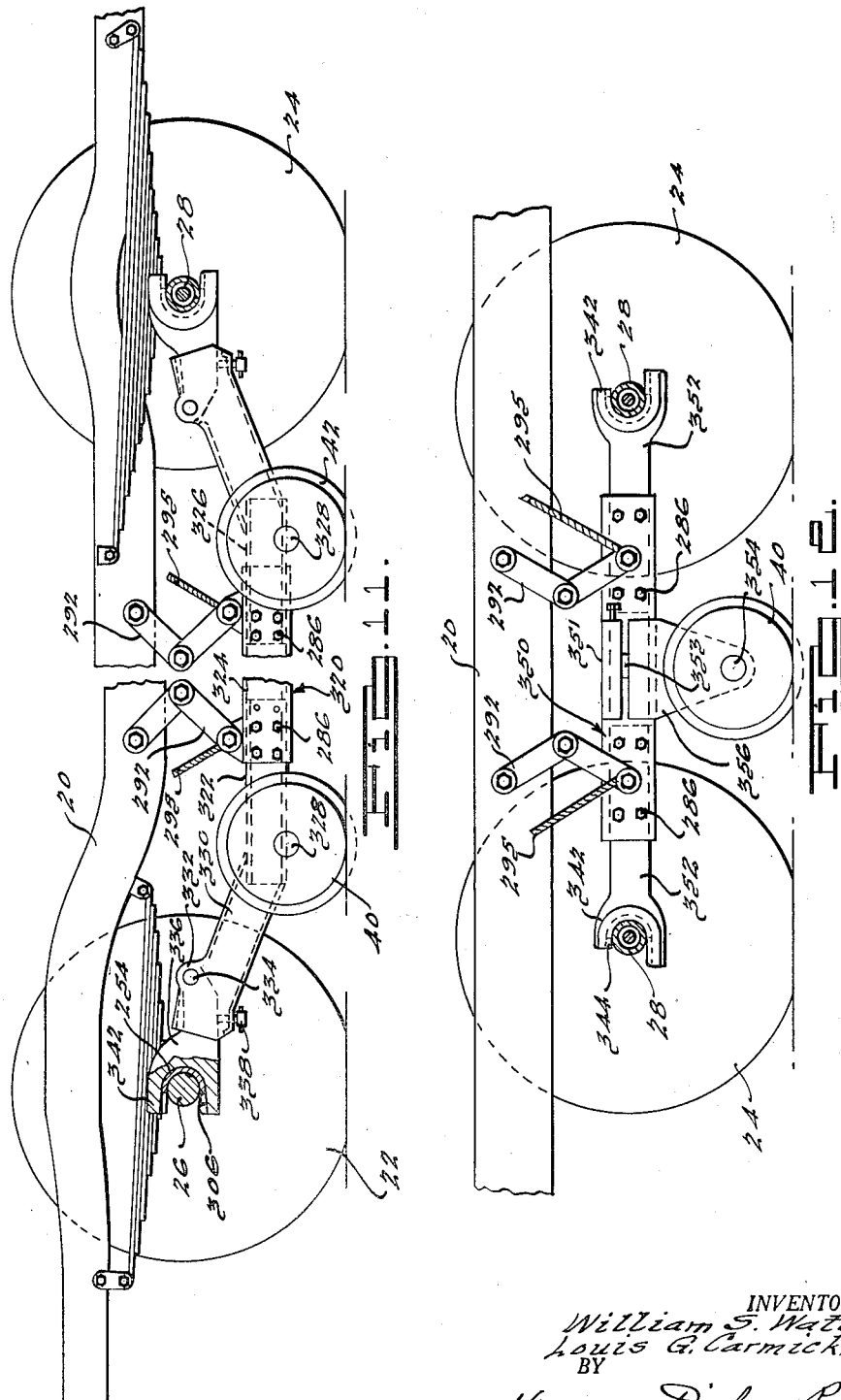
INVENTORS
William S. Watts,
Louis G. Carmick, Jr.
BY
Harness, Dickey & Pierce
ATTORNEYS.

Patented Dec. 11, 1951

2,577,830

UNITED STATES PATENT OFFICE 2,577,830

COMBINED ROAD AND RAIL VEHICLE

William S. Watts, Dearborn, and Louis G. Carmick, Jr., Dearborn Township, Wayne County, Mich., assignors to Evans Products Company, Detroit, Mich., a corporation of Delaware Application July 15, 1944, Serial No. 545,132

31 Claims. (Cl. 105—215)

The present invention relates to vehicles adapted for both highway and rail travel, and/or to readily added pilot structure or appliance for converting road vehicles for rail operation or for selective road or rail operation, and more particularly to such vehicles comprising sets of main wheels which carry the entire vehicle load during highway travel and which, during rail travel, are guided upon the rails by, and share the load with, cooperating sets of pilot wheels.

Principal objects of the present invention are to be provide constructions of the above type, which are simple in arrangement, relatively light in weight, and low in cost; to provide such vehicles in which the pilot structure characterized as aforesaid, may be either permanently or removably applied to existing vehicle structures with a minimum of effort and expense; to provide such vehicles embodying improved means for transferring a desired portion of the vehicle load to the pilot wheels operative in the short vertical travel of pneumatic tire deflection and independently or substantially independently of the main spring suspension for the road wheels, and for immediately and directly increasing the transferred share of the load to the outside pilot or pilots when rounding curves; to provide such constructions in which the pilot wheels, there being preferably at least one pair of such pilot wheels for each of the front and rear sets of main wheels, are carried by a subframe structure which extends between a pair of main axles; to provide such constructions in which the subframe is formed in part by the main axles of the vehicle; to provide such constructions in which the subframe comprises relatively adjustable elements which adapt it for use with particular vehicles and/or which adapt it for ready removal from and application to such vehicles; to provide such constructions in which in certain embodiments the pilot structure is always carried by the main vehicle suspension, more or less independently of the vehicle body and in which, in other embodiments, the pilot structure is loaded through the main suspension but, when retracted for road travel, is carried by the vehicle body; to provide such constructions embodying a plurality of pilot wheel adjusting mechanisms, having different operating speeds and wherein more particularly one such mechanism serves to load the pilot structure through the main suspension and the other mechanism serves to retract the pilot structure and suspend it directly from the main vehicle body; and to generally improve the constructions and arrangement of vehicles of the above indicated type.

With the above as well as other, and, in certain cases, more detailed objects in view, preferred but illustrative embodiments of the invention are shown in the accompanying drawings, throughout the several views of which corresponding reference characters are used to designate corresponding parts, and in which:

Figure 1 is a view in side elevation of a structure embodying the invention;

Figure 2 is a top plan view, partly broken away, of the structure of Figure 1, with the body structure of Figure 1 removed;

Figure 3 is an enlarged view of the improved supporting connection between the respective pairs of pilot wheels and their associated main wheels, taken along the line 3—3 of Figure 2;

Figure 4 is a fragmentary view in front elevation taken along the line 4—4 of Figure 3;

Figure 5 is a fragmentary view, taken along the line 5—5 of Figure 2;

Figure 6 is a view in vertical section, taken along the line 6—6 of Figure 5;

Figure 7 is a fragmentary view in section, taken along the line 7—7 of Figure 2;

Figure 8 is a fragmentary view in vertical section, taken along the line 8—8 of Figure 7;

Figures 9, 10, 11 and 12 are somewhat diagrammatic views of further embodiments of the invention;

Figure 13 is a fragmentary view in section, taken along the line 13—13 of Figure 9;

Figure 14 is a fragmentary plan view of the structure shown in Figure 13.

It will be appreciated from a complete understanding of the invention, that many of its features may be embodied in a wide variety of vehicles intended for operation both upon highways and upon rails, and that such features may be embodied in various different forms other than the forms specifically disclosed herein. By way of illustration but not of limitation, the invention is herein disclosed in connection with vehicles having main sets of pneumatic tired wheels which normally sustain the entire vehicle load during highway travel, and which, during rail travel, are guided upon the rails by, and share the vehicle load with, flanged pilot wheels.

Certain structural features which are not claimed herein, are claimed in the copending application of the present applicant Watts and Charles S. Davidson, Serial No. 545,131, filed July 15, 1944, now Patent 2,478,647.

Referring first to Figures 1 through 8, the vehicle is illustrated as comprising a body 20, herein shown as being a conventional chassis, it being understood that the term body is generically used to include those parts of the vehicle which, in a vehicle having a spring suspension, are conventionally referred to as the sprung parts as distinguished from the unsprung parts of the vehicle. The vehicle also includes longitudinally spaced pairs of main wheels 22 and 24, either of which, so far as concerns the present pilot structure, may be utilized as the front wheels, wheels 22 being specifically shown as the front wheels, and wheels 24 being specifically shown as the rear wheels. Wheels 22 and 24, both or either of which may be dirigible, are conventionally provided with main axles 26 and 28, both or either of which may be a driving axle. Both sets, or either set, of main wheels may be considered as being equipped with brake mechanism.

In the broader aspects of the invention, the suspension between the body and the main axles may be either rigid or resilient. In many cases, however, it is preferred to utilize a usual resilient suspension, herein illustrated as being afforded by usual semi-elliptic springs 30 and 32, it being understood that the springs 30 and 32 are arranged in pairs, and may be conventionally connected to the body 20 and to the corresponding main axles. It will further be understood that the springs 30 and 32 may and preferably do have the softness or relatively low spring rate which conventionally characterizes main vehicle suspensions.

In the preferred practice of the present invention, the suspension 30—32 is common to the main whels 24—26 and to the pilot wheels 40—42. In the embodiment now being described, the connection between the pilot wheels and the suspension 30—32 comprises a subframe and cooperating linkages which, in substantial part, relieves the suspension 30—32 of the overturning couple which would otherwise be applied thereto when the pilot wheels are loaded, and which enables braking torques applied to the main axles to increase the loading of at least certain of the pilot wheels. These actions are discussed below, in connection with the description of the operation of the vehicle.

Continuing with the description of the present structure, the subframe comprises the two laterally spaced longitudinally extending frame members 44, which are preferably metallic, and may be of any suitable section. As shown, members 44 are of I section. Referring particularly to Figure 3, the front ends of members 44 are provided with forklike members 46, having legs 48 and 50, the outer ends of both whereof are bifurcated. Each leg 48 is pivotally connected by a pin 52 to a pad 54 which is received between the bifurcated portions of the corresponding leg. Each pad 52 is received between the associated spring 30 and the corresponding spring pad 56, and is held in place by the usual spring-retaining U-bolts. As shown, therefore, pads 52 are rigid with the corresponding main axle.

Referring particularly to Figures 5 and 6, the rear end of each side member 44 is connected by a suitable bracket 60, to a pair of short shackle links 62. Links 62 in turn are pivotally connected by a pin 64 to a pad 66. As shown, each pad 66 is rigid with respect to the rear main axle, being retained in place between the usual spring pad 68 and the associated spring 32 by means of the U-bolts 70.

As shown, the bracket 60 is made up of spaced pairs of side plates 61 and 63, which are welded together, plates 63 being also welded to the corresponding side member 44. The upper ends of plates 61 receive between them a pin 65, to which the lower ends of the previously mentioned links 62, and the hereinafter described arm 110, are connected. Similarly, the lower ends of plates 63 support a pin 69 to which the hereinafter described link 112 is pivotally connected.

From the foregoing it will be appreciated that in the present embodiment the subframe structure is comprised primarily of the side members 44 and the main axles 26 and 28, the connections between these members being such, by virtue of the links 62, as to permit limited relative movements, longitudinally of the vehicle, between main axles 26 and 28. As will be understood, these longitudinal movements are needed in order to accommodate the flexing action of the main suspension springs 30 and 32.

The respective pairs of pilot wheels 40 and 42 are provided with axles 80 which may be and preferably are identical, and a description of one whereof will consequently suffice for both.

Referring particularly to Figures 2, 3, 4, 7, and 8, each pilot axle 80 comprises a central section of square or box section, and a pair of wheel supporting trunnions 82. Each central section is made up of four platelike members 84, 86, 88, and 100, suitably secured together as by welding, indicated at 102. Adjacent each end thereof, the central body portion is provided with a block 104, which may be and preferably is welded in place therein, and which receives, with a press fit, the corresponding trunnion 82.

The pilot wheels are conventionally secured in place upon the trunnions 82, for rotation with respect thereto and may either be rigid, as shown, or may be arranged, in accordance with the disclosure of Nampa Patent No. 2,203,965, to incorporate sound deadening cushioning material which also imparts some resilience thereto. In the latter case the means which imparts the resilience to the pilot wheels will be recognized as having a substantially higher spring rate than that of the main suspension springs 30 and 32 and the main rubber tired wheels 22 and 24.

In the present instance, the front pilot axle 80 is connected to the previously described subframe structure by a pair of laterally spaced identical four-bar linkages, each comprising an upper arm 110, a lower arm 112, a pad 52, and a fourth link constituted by the fork 46. To enable the pilot wheels to be raised and lowered, each arm 112 is adjustable in length. Loads applied to the pilot wheels are transmitted through the just mentioned linkages which, as will be evident, engage the pilot axles at points immediately adjacent the respective pilot wheels.

Referring particularly to Figures 2, 3, 4, 7, and 8, each adjustable arm 112 comprises an outer sleevelike member 130 which slidably receives an inner tubular member 132, a conventional grease seal 134 and boot 136 being provided to protect the slidable connection between these members. The outer end of the inner member 132 is provided with a plug 140, and is laterally flattened as indicated at 142 so that it may be received between the bifurcated portions of the associated arm 50 or bracket 60, as the case may be. Pins 144 complete the pivotal connections between the portions 132 and the last mentioned members.

The outer end of each outer member 130 is provided with a flange 150 through which, by means of a series of circumferentially arranged bolts 152 and studs 154, member 130 is secured to the associated pilot axle. To reinforce the pilot axle in the regions of the arms 112, the former is provided with reinforcing plates 160 and 162, which may be and preferably are welded in place therein. The bolts 152 pass entirely through the pilot axle, the reinforcing plates 160 and 162, and also serve to secure the corresponding cap 164 in place. The studs 154 pass through apertures in the flange 150 and are threaded into the corresponding side of the pilot axle.

In order to slidably adjust the portions 130 and 132 so as to correspondingly adjust the length of the arm 112, the inner member 132 is provided with internal threads 170 which mate with correspondingly external threads on a screw 172 which is received within the member 132. The outer end of screw 172 projects outwardly of the associated pilot axle, through an aperture provided therefor in the previously mentioned cap 164, and terminates in a spheroidal portion 174, having laterally projecting pins 176, which adapt it for engagement by a usual cranklike tool 178.

Within the axle member 172 is provided with a head constituted in part by a radial enlargement 180 which is integral therewith, and in part by a cooperating head portion 182 which is fittted over the reduced end 184 and is held in place thereon by a locking ring 186.

As will be evident, the head, comprising members 180 and 182 is received between the reinforcing plates 190 and 192, which are preferably provided with wear plates 190 and 192. Being narrower than the spacing between these wear plates, the head is enabled to have an unrestricted or free motion therebetween. This lost motion is of particular importance for reasons discussed below.

Intermediate its ends, each arm portion 130 is provided with a bifurcated bracket 200. The lower end of each arm 110 is pivotally connected to corresponding bracket 200 by means of a pin 202. The upper end of each arm 110 is pivotally connected by means of a pin 204, to the corresponding pad 54 or 66, as the case may be.

It is to be noted that the pins 52, 144, 202, and 204, are of substantial length, the same being true of the bearing openings in the corresponding arms and the spacing between the arms of the corresponding supporting portions. Thus the connections afforded thereby are able to maintain the corresponding pilot axles and main axles in alignment with each other transversely of the vehicle. It is preferred, however, to reinforce the subframe structure so as to better enable it to maintain such alignment. This may be done in various ways as, for example, by means of the cross members 210 and 212 shown in Figure 2 as extending between cooperating pairs of upper arms 110.

The rear pilot axle is connected to the subframe members 44, by a pair of transversely spaced identical three-bar linkages. Each such linkage comprises an upper arm 110, a lower arm 112 and the corresponding one of the previously mentioned brackets 61, it being understood that arms 110 and 112 may, and preferably do, have the same construction as the corresponding front arms. As in the case of the front pilot wheel mounting, pins 64, 65, 69, and 202 are of substantial length and are thus able to withstand substantial forces tending to move the pilot axle transversely of the vehicle. It is preferred to reinforce the linkages by means of the previously mentioned cross members 210.

Referring particularly to Figures 7 and 8, a sprocket, 220 is associated with each rotatable screw 172, and, as shown, is screwed in place between the previously described head elements 180 and 182. Suitable means, such as one or more dowel pins 222, may be utilized to properly locate the sprocket between the head elements and to prevent relative rotation therebetween. A chain 224 is trained over the two sprockets associated with a particular pilot axle, and passes axially through the tubular pilot axle. Each screw 172 is provided with an operating head 174, which accommodates the previously mentioned tool 178, and it will be realized accordingly that the tool may be applied at either side of the vehicle to effect the corresponding raising and lowering movements.

As shown, locking means are provided to prevent undesired rotation of the adjusting screws 172. As shown, such locking means comprises clips 230, one whereof is secured to the associated pilot axle adjacent at least one of the screw heads 174 therefor. Each clip 230 is provided with a slot 232 through which the head 174 may be projected when the pins 176 are in a substantially vertical position. When so disposed, the sides 234 of the slot cooperate with the pins 176 to prevent rotation of the screw. To enable an adjustment of the structure the clips 230 may readily be swung in a clockwise direction as viewed in Figure 3, to a position in which they do not interfere with the operation of the screws.

Considering now the operation of the above described structure, it will be appreciated that during normal highway travel, the pilot wheels 40 and 42 are elevated to positions such as are indicated in dotted lines in Figures 3 and 5, in which positions they give adequate road clearance. As will be understood the respective pairs of pilot wheels may be elevated to the just mentioned positions by rotating the associated screws 172 in a direction such as to lengthen the lower arms 112 of the corresponding linkages. During such elevating movements, the weight of the pilot wheels urges the members 132 and their associated screws 172 in a rightward direction as viewed in Figure 7, causing the faces of the head elements 182 to bear against the corresponding inner wear plates 192.

When so elevated, the pilot wheels and axles are firmly and positively held by their associated linkages, which linkages, it will be noted, are inherently rigid and permit only the amount of relative movement between a particular pilot wheel and its corresponding forks 46 or brackets 61, which is allowed by the lost motion connection between the associated screw 172 and its mounting. This lost motion is of particular importance in accommodating the vehicle to irregularities of the roadway. For example, assuming that a particular roadwheel is driven up over an obstruction such as curbing, such roadwheel is required to be elevated above its companion road wheel. This elevating movement compresses the corresponding main suspension spring 30 or 32, and also cocks the subframe to a certain extent, which cocking is permitted by the inherent resilience of the relatively long subframe members 44, and by the play in the subframe bearings resulting from normal manufacturing tolerances. This elevating movement also subjects the assembly comprising a pilot axle and its linkages to a similar cocking force. By virtue of the relatively short length of the links which make up the pilot wheel linkages, it is preferred not to rely on the just mentioned factors to accommodate such latter cocking force. Instead it is preferred to provide the aforesaid lost motion which is, of course, proportioned to be sufficient in amount to allow for all reasonable operating conditions, and which enable one or the other of the links 112 of the corresponding pair to become elongated sufficiently to accommodate the structure to the elevated position of such one roadwheel.

With the pilot wheels elevated, therefore, the vehicle functions as a conventional road vehicle having all of the normal riding characteristics except that the unsprung weight of the vehicle has been increased by an amount equal to the weight of the aforesaid pilot structure. A particular advantage of the present construction is that the elements making up the pilot structure, though of sufficient strength to produce a very sturdy rail vehicle, are relatively light in weight, and so do not increase the unsprung weight of the vehicle to an undesirable degree.

Considering now the operation of the vehicle upon the rails, it will be appreciated that after the roadwheels have been aligned upon the rails 240 in accordance with conventional practice the adjustable arms 112 may be shortened to lower the pilot wheels to the full line rail engaging positions shown in Figures 1, 4, and 5. In this connection a particular advantage of providing the adjustment in the lower arm of each pilot wheel linkage is that a relatively large pilot wheel movement may be accomplished with a relatively small amount of change in the length of each arm 112.

The weight of the pilot wheels maintains the screw heads in engagement with the wear plates 192 until such time as the pilot wheels engage the rails. Thereafter, and until the screws 172 have been turned sufficiently far to cause the heads to travel the full line position shown in Figure 7, in which the outer wear plates 190 are engaged, the pilot wheels are loaded only to the extent of their own weight, the entire vehicle load being borne by the road wheels. As the adjusting movement is continued past such position, a progressively increasing proportion of the vehicle load is transferred from the road wheels to the pilot wheels, links 112 being loaded in tension and links 110 being loaded in compression. This transfer, of course, progressively reduces the deflection of the road wheel tires. By virtue of the well-known relatively high spring rate of pneumatic tires, it will be appreciated that a substantial fraction of the vehicle load can be transferred without requiring more than a very small change in tire deflection of the order, for example, of less than one inch between full-load and no-load conditions. It will be appreciated that the higher the center of gravity of the vehicle using this invention, the longer is the effective lever arm causing direct load transfer to the outside pilots during a turn. Also it will be understood that, in general, the center of gravity of the vehicle rises as it is loaded. Having in mind the many different types, designs, and heights to the centers of gravity of various vehicles, it will be understood that, for any given vehicle under particular operating conditions, there will be a desired minimum load to be maintained on the pilots, and this, by way of example only, may vary from around a quarter to more than half the vehicle load. Thus in general, changes in tire deflections, due to pilot loadings, may be less than one-half inch. A practical measure of the amount of transferred load is, of course, provided by the increasing resistance to turning of the screws 172, and it is preferred to so proportion the cranklike tool 178 as to enable a workman, by exerting 80 or 100 pounds effort against the tool, to transfer a desired amount of vehicle load to the pilot wheels.

As will be recognized, the particular percentage of the vehicle load which it is desirable to transfer to the pilot wheels, may be widely variable to suit different operating conditions. As the pilot wheel load is increased, the likelihood of derailment, tire wear, and the rolling resistance of the vehicle, are reduced.

Independently of the degree to which the pilot wheels are loaded, it will be appreciated that the present construction is one wherein cooperating pairs of main roadwheels are connected to the vehicle through a suspension, in this case the main springs 30 and 32, which are common thereto. During operation of the vehicle upon the rails, therefore, the degree to which the pilot wheels are loaded is wholly independent of the degree to which such main springs may be deflected by vertically applied loads.

As will be recognized, with the construction now being described, the ratio in accordance with which the load is divided between a particular pair of pilot wheels and its corresponding pair of main wheels, for particular advanced positions of the corresponding screws 172, is determined by the relation between the relative resiliencies of three separate factors of the present suspension which are (a) the resilience of the tires associated with the roadwheels, (b) the resilience of the pilot wheel mounting, including the subframe, the associated linkages, and any resilience which is incorporated in the pilot wheels and (c) the resilience of the main suspension 30 or 32 with respect to overturning couples applied thereto. This situation can best be understood by a consideration of the forces acting on the system.

Considering first the front pilot wheels, it will be appreciated that as the associated screws 172 are advanced, in loading these pilot wheels, the associated links 112 and arms 50 are placed in tension. Links 110 on the other hand are placed in compression. Components of the latter forces stress pads 54 in compression and also stress arms 48 in compression. Forks 46 are consequently subjected to clockwise forces, as viewed in Figure 3, which forces are resisted by the relatively long and inherently somewhat springy side members 44. Thus, even though arms 112 and 110, forks 46 and pilot wheels 40 be regarded as rigid, the pilot wheel mounting as a whole may be regarded as being resilient.

Vertical components of the forces applied through links 110 tend to rock pads 54 about pins 52 as centers, which forces are resisted by the relatively high resistance of main springs 30 to overturning couples, it being particularly noted that pads 54 are relatively short in length, and that as the length of pads 54 are shortened, or more closely approach zero, the overturning couple applied to springs 30 is reduced.

Thus, as the screws 172 are turned, relative vertical movement between the pilot wheels and the main axle is resisted by the resistance to overturning couples of the main springs 30 and by the resistance to flexure of the pilot wheel mounting.

As the screws 172 are turned, shortening the links 112, the pilot wheels tend to move downwardly with respect to the main axle 26 or as stated otherwise, tend to cause the main axle 26 to rise, thereby decreasing the deflection of the main wheel tires and consequently relieving the load on the main wheels. The forces tending to cause the just mentioned downward movement of the pilot wheels relative to the main axle are transmitted through the pilot wheel mounting and the main springs 30. To the extent that the latter two factors yield, continued turning of the screws produces only flexure of the pilot wheel mounting and overturning of the main springs 30 and do not produce the relative vertical movement of the pilot wheels relative to the main axle. It will thus be appreciated that the exact proportion of the vehicle load, which is transferred to the pilot wheels for a given position of the screws 172, depends upon the relation between the spring rates of the main tires on the one hand and the pilot wheel mounting and main springs (in respect to overturning forces) on the other hand. Although pneumatic tires have relatively high spring rates, it will be recognized that it may be expected that the latter two factors have a combined spring rate which is at least as great as that of the tires. Preferably the system is so adjusted that the spring rate of the latter two factors is considerably in excess of the spring rate of the tires, it being borne in mind that the main springs 32, though relatively soft with respect to vertical forces, are very stiff with respect to overturning forces.

The analysis with respect to the loading of the rear pilot wheels is much the same as that discussed above. Namely, the advancing movement of the associated screws stresses links 112 in tension and stresses links 110 in compression, thereby subjecting brackets 60 to counterclockwise forces, which are resisted by the relatively long side frame members 44. The vertical force on the main axle resulting from the tendency of the pilot wheels to move downwardly with respect to the main axle, is transmitted through the links 62. These forces, acting through lever arms determined by the substantially horizontal distance from the main axle 28 to the pivots 64, subject the main springs 32 to an overturning couple. The load is divided accordingly between the rear pilot wheels and the rear road wheels on the same basis that such load is divided between the front pilot and roadwheels.

Considering now the operation of automatically and immediately increasing the load on at least the outside pilot wheels in rounding a curve, it will be understood that as the vehicle enters a curve, the body structure is immediately subjected to a centrifugal force which produces an increase in the loading of the outside main suspension springs and correspondingly decreases the loading on the inside main suspension springs. This increase in loading of the outside suspension tends to increase the deflection of the tires of the outside roadwheels. Assuming that the mounting between a particular pilot wheel and its corresponding roadwheel is rigid, as distinguished from a resilient, it will be appreciated that such pilot wheel positively resists the downward movement of the corresponding end of the associated main axle, which would be needed to increase such tire deflection. The increase in loading on the outside of the vehicle, therefore, instead of being transferred to the outside roadwheels would be immediately and entirely transferred to the outside pilot wheels. This increase in load serves to positively prevent the centrifugal forces acting on the vehicle from causing the outside pilot wheels to ride up the rail edges on their flanges and become derailed. This increase in loading also is entirely proportional to the magnitude of the centrifugal force acting on the vehicle. Stated another way the greater the centrifugal force or the sharper the curve, the greater is the load transfer.

As discussed above, the main suspension springs in respect to overturning couples and the subframe members 44 may be expected to be at least somewhat resilient. In addition, in many cases, as previously mentioned, some resiliency may be introduced into the pilot wheels themselves and/or into the linkages. In a practical sense, therefore, the pilot wheels may be regarded as connected to the main suspension through means having some resiliency and the main road wheels are, of course, connected to the main suspension through the resilient tires. In the presence of a change in the vehicle loading, therefore, the exact degree to which such change is divided between a particular pilot wheel and its corresponding road wheel is determined by the ratio between the same factors as are discussed above in connection with the description of the operation of initially loading the pilot wheels.

It will be understood that as the vehicle enters a curve, and its load center shifts to the outside, the load on the inside main and pilot wheels is decreased. The lost motion, previously described, enables the inside tire deflection to decrease without decreasing the inside pilot wheel load to a value less than is represented by its own weight. This is for the reason that as the inside end of the main axle rises, the head of the corresponding screw 172 can, if necessary, move away from the outside wear plate towards the inside wear plate.

Under such conditions, the load on the inside pilot wheels is always maintained at a value well above its own weight. This is for the reason that although no load be applied to the inside pilot through the inside triangular linkage, a fraction of the load applied through the outside linkage is transmitted through the pilot axle to the inside pilot wheel. This fraction is a relatively minor one, because the triangular linkages engage the pilot axles at points immediately adjacent the ends thereof; thus the major part of the load transfer to the pilot wheels is taken by the outside pilot wheels. This is an important advantage resulting from application of pilot loads at points near the pilot wheels, or near the ends of the pilot axles where, as here, pilot axles are employed. In this connection, it is to be borne in mind that it is equally important that the pilot loads be transferred from the main suspension or from the road wheels at points close to the road wheels. Another important advantage of this loading arrangement is that it is possible to use relatively light pilot axles, as distinguished from the relatively rugged pilot axles which are required in constructions in which pilot axle loads are applied at the centers thereof.

Continuing with the operation, it will be noted that the shackle connection between one main axle, in this case the rear axle, and the pilot subframe readily accommodates the relative movements of the main axles longitudinally of the vehicle which normally accompany springing movements of the main suspension springs. The "breathing" thus afforded by the subframe does not interfere, however, with its important function of balancing out, at least in a large part, the overturning couples which would otherwise be transmitted to the main suspension by virtue of the loading of the pilot wheel.

A further feature of the above described construction is that braking loads applied to the main road wheels increase the loading of those pilot wheels which are in advance of the braked road wheels. Thus, if the brakes are applied when the vehicle is moving ahead, the load on the front pilot wheels is increased. If the vehicle is braked while operating in a reverse direction, the load on the rear pilot wheels is increased, such pilot wheels being in a leading position under the conditions stated.

More particularly, and referring to Figure 3, it will be appreciated that a braking load applied to the front wheels 22 during forward vehicle travel, applies a counterclockwise torque to the corresponding axle 26. This torque serves to place links 110 in compression and to place links 112 in tension, and is resisted by the resistance to overturning of the main springs 30. To the extent that such springs 30 yield, therefore pilot wheels 40 do move downward with respect to the main axle 26. This downward movement reduces the tire deflection and increases the pilot wheel loading by an amount equal to the change in load represented by such change in deflection. It will be noted that the change in pilot wheel loading, due solely to braking effects, is shared equally by the inside and outside pilot wheels.

The analysis with respect to the increase loading of the rear pilot wheels during reverse operation of the vehicle is obviously the same. It will be noticed that in the illustrated embodiment the load is relieved, by braking effects, from pilot wheels which are trailing with respect to the corresponding road wheels, which factor is, however, unimportant since, under the conditions stated, the primary guiding effect is obtained from the leading pilot wheels.

It will be recalled from previous discussion that the degree to which the main springs 30—32 are required to absorb overturning couples depends upon the horizontal spacings between the respective axles 26 and 28, and their associated pivots 52 and 64. Similar comments apply to the increase in pilot loading which results from braking operations. Thus, these horizontal spacings are determined by the requirements of the particular vehicle in respect to the just mentioned axle-overturning and braking factors.

It will be appreciated that although the pilot structure as a whole of Figures 1 through 8 may be applied to and removed from the associated roadwheel with comparative ease, such pilot structure is primarily intended to be used as a more or less permanent part of the vehicle. Similarly, it will be appreciated that as aforesaid, in the embodiment of Figures 1 through 8, the pilot structure is at all times carried by the main vehicle suspension. Figures 9 through 16 are illustrative of further embodiments of the invention, having certain features in common with the vehicle of Figures 1 through 8, and which also distinguish therefrom in many respects. More particularly, the embodiments of Figures 9 through 16 may be generically described as ones in which the pilot structures are adapted for ready application to and disconnection from the main suspension. In certain instances, the pilot structure is entirely removed from the vehicle in preparing it for usual road travel and in certain other instances the pilot structure, when disconnected from the main suspension, is carried by the sprung part of the vehicle. Thus, though the pilot structure may form a more or less permanent part of the vehicle, it is, when inactive, carried by the sprung part of the vehicle and so, during road travel, does not add to the unsprung weight of the vehicle. The importance of this feature will be apparent.

More particularly, and referring to Figure 9, the illustrated vehicle is provided with a body 20, and with usual pairs of pneumatic tired roadwheels 22 and 24. The suspension includes usual laterally spaced semielliptic springs 30 and 32.

In this instance, the pilot structure comprises a generally rectangular subframe, having similar laterally spaced side members 250, the respectively opposite ends of which are joined by pilot axles 252, which may duplicate the previously described pilot axles except that they are not required to embody the previously described adjusting elements.

The pilot axles 252 carry corresponding pairs of pilot wheels 40 and 42. In order to connect the pilot structure to the main suspension, the main axles 26 and 28 are provided with laterally spaced pairs of adapting brackets 254, which are received within and embraced by corresponding pairs of socket members 256, which are adjustably carried by the side frame members 250. Brackets 254 may be rigidly connected to the associated axles in any suitable way, as by welding, and these brackets 254 give a standard size of fitting for different vehicles having different axle diameters or sizes. It will be appreciated that the spacing between the side members 250 may be such that they lie between, or alternatively, in outboard relation, to the main suspension springs 30 and 32, the former relation being generally preferred.

It will be noticed that the sockets 256, by embracing the fore and aft sides of the brackets 254, afford a driving connection between the pilot structure and the vehicle which limits relative longitudinal movement therebetween, it being preferred to introduce enough play into at least one pair of these connections to accommodate the relative movement lengthwise of the vehicle, between the main axles 26 and 28, which results from usual springing movements of the vehicle because of the characteristics of the conventional semielliptic springs. In addition, the inwardly directed side walls of the sockets, by embracing the lateral faces of the brackets 254, positively prevent relative movements between the pilot structure and the main axles in a direction crosswise of the vehicle. Thus, the sockets and brackets cooperate to positively maintain the main and pilot wheels in proper alignment with each other. It will be apparent that this general relative embracing arrangement may be inverted so that the brackets embrace the sockets.

The illustrated adjusting mechanism comprises cooperating wedge elements 264, one pair of such elements being associated with each socket. Each lower wedge element is rigidly secured to the corresponding side frame member 250 and defines a groove having side walls 270 and end walls 272 within which the corresponding upper wedge element is movable in a direction longitudinally of the vehicle. The end and side walls 270 and 272 also snugly receive the lower portions of the corresponding sockets 256, and thus define a journal within which these sockets are vertically movable but which prevent lateral and longitudinal movements of the sockets. Any suitable mechanism may be utilized to control the positions of the upper or movable wedge elements 262, a conventional drive screw 281 being illustrated. It will be appreciated that the wedge elements may have a sufficient range of movement to accommodate the pilot structure to vehicles of different axle heights, or may be designed to have only a sufficient adjusting movement to provide the required range of loading adjustment.

The structure now being described is one in which, during road travel, the pilot structure as a whole is disconnected from the main axles 26 and 28, and is carried entirely by the body 20, thereby relieving the unsprung portions of the vehicle of any additional weight. To accomplish this, the subframe structure is made adjustable to enable its connection and disconnection from the main axles and in addition it is provided with selectively operable means for enabling it to be raised to an inactive position and carried to the body 20. Obviously, disconnecting the links 290 and 292 from the body or from the pilot structure will permit complete removal of the pilot structure.

More particularly, the side members 250 are each formed of at least two and, specifically, three telescopically related or inter-nested channel-shaped portions 280, 282, and 284, which are adapted to be secured in adjusted relation to each other by studs 286. Preferably, but not necessarily, the respective portions of the side frame members are interconnected by cross members 288 so that the subframe as a whole may be considered as constituted by three rectangular sections. In addition to adapting the subframe for adjustment to accommodate it to vehicles of different wheel bases, the just mentioned connections also enable the separation of the subframe sections, so as to enable disconnection of the pilot structure from the main axles and raising or removal.

As shown, the individual subframe sections are loosely connected to the body 20 by associated linkages 290, 292, and 294. These linkages are pivotally connected to the body 20 and to the corresponding subframe sections respectively, and are arranged in similar pairs associated with the respectively opposite sides of the vehicle. The individual linkages may be adapted for raising and lowering operations from any remote point, as, for example, by means of cables 295 which may extend to winding devices (not shown) carried by the body 20, and which winding devices may and preferably do have a relatively high rate of operation as compared to the rate afforded by the screws 281.

It will be apparent that any suitable raising means can act directly on the pilot structure, in which case the links 290 and 292, or their equivalents, will serve only as guides during raising and to prevent lateral motion when raised.

Thus the present structure provides pilot wheel control mechanisms having two different rates of travel, the faster mechanism being utilized, in this instance, to retract the pilot wheels to inoperative position and to lower them to an initial track engaging position, and the slower mechanism being utilized to apply a desired amount of load to the pilot wheel.

Considering now the operation of the structure as a whole, the parts are shown in condition for rail travel. Under these conditions, axles 26 and 28 are received in the corresponding sockets 256, and the wedge mechanisms may be considered as having been adjusted to apply a desired load to the pilot wheels. Under these conditions also, the winding means (not shown) associated with the retracting cables 295 are released, so that no load is transmitted therethrough. Under these conditions, links 290, 292, and 294 are unloaded, a free lost motion connection therefor being provided by the slots 296 in links 290 and 294 and by the articulated arrangement of links 292.

With the exception noted below, the arrangement of Figure 9 will be recognized as being functionally the same as the arrangement of Figures 1 through 8. As specifically shown herein, the adapting brackets 254 are cylindrical in form, and in addition to being freely movable with respect to their sockets 256 in an upward direction, are also freely rotatable therein. Thus, pilot wheel loadings do not apply any overturning couples to the main axles, and vehicle wheel loads are thus divided between the main and pilot wheels in the ratio between the resiliencies of the main pneumatic tired wheels and the pilot structure. As before, the principal springiness of the pilot structure will be afforded by the subframe, and it is preferred that this subframe have a spring rate at least as high as, and in many instances much higher than that of the tires under vehicle loadings of the magnitudes usually encountered. It will be appreciated that in the broader aspects of the invention, brackets 254 may be made non-rotative with respect to their sockets 256, which arrangement enables pilot wheel loads to apply ogee stresses to the main suspension members. With this arrangement, braking loads applied to the wheels alter the pilot wheel loadings in the general manner described in connection with Figures 1 through 8.

To convert the vehicle for road travel, the studs 286 may be released, enabling the central subframe section 282 to be slid forwardly or rearwardly sufficiently far to clear one or the other of the end sections 280—284. Thereafter, the free end of the central section may be dropped, enabling it to be slid in the other direction and sufficiently far to clear the other end sections. With the subframe sections thus separated from each other, the inner ends of the end sections may be dropped so that the sockets 256 clear the brackets 254, after which such end sections may be moved towards the corresponding end of the vehicle sufficiently far to clear the front and rear axles. Finally, the cables 295 may be actuated to draw the individual subframe sections upwardly into engagement with the under side of the body 20, in which positions they do not interfere with road clearances. The operation of reconverting the vehicle for rail travel may, of course, be effected in the reverse manner.

The embodiment of Figure 10 corresponds to that of Figure 9, with the exceptions noted below. More particularly, in Figure 10 no provision is made for carrying the pilot structure from the body 20 during road travel. Instead, the arrangement is one in which the pilot structure is applied to the vehicle only during rail travel and is entirely removed therefrom during road travel. In this case, the subframe 250' is made up of two telescopically related sections, as distinguished from the three sections described above. In addition, the sockets 300 are modified to eliminate one of the vertical restraining surfaces thereof. These sockets each have one vertical restraining surface 302, a horizontal loading surface 304 and an inclined entering surface 306, which facilitates the application of the pilot structure to the vehicle. Thus, the front sockets 300, in addition to sustaining a portion of the load on the front suspension, also afford a driving connection between the vehicle and the pilot structure during forward operation of the vehicle. The rear sockets 300, in addition to transmitting load to the pilot structure, afford a driving connection between the pilot structure and the vehicle during reverse operation. Sockets 300 embrace the brackets 254, as described in connection with Fig. 9, and so cooperate therewith to maintain the main and pilot wheels in alignment with each other. Sockets 300 also accommodate the previously mentioned relative movements, lengthwise of the vehicle of the main axles, which result from normal springing movements.

The subframe sections 251 and 253 may be provided with retractable pairs of supports 301, having the same gauge as the associated track, and which hold the inner ends of the subframes in elevated aligned relation during application of the pilot structure to the vehicle. During rail operation, supports 301 occupy the illustrated retracted positions.

It will be recognized that during rail operation the embodiment of Figure 10 is functionally the same as that of Figure 9, it being appreciated that the sockets 300 are provided with adjusting mechanisms as described in connection with Figure 9. In converting the vehicle for road travel, studs 286 are removed, enabling the front and rear subframe sections to be freely separated from each other, which action permits them to be withdrawn from the vehicle. It will be recognized that the pilot structure may be unloaded preparatory to this operation, either by actuating the adjusting mechanisms associated with the sockets 300, or by elevating the main axles 26 and 28. Similar comments apply to the structure of Figure 9.

In Figure 11, the pilot structure is arranged to position the front and rear pairs of pilot wheels 40 and 42 between the pairs of main wheels 22 and 24, which arrangement is advantageous in certain instances in overcoming clearance problems with overhung portions of the body 20 at the front and rear ends of the vehicle. A particular advantage of the arrangement of Figure 11 results from the fact that it produces a pilot structure having a relatively short wheel base, of the order of magnitude, for example, of the wheel base of the trucks of street railway vehicles. The vehicle of Figure 11 is thus particularly adapted for use on street railway systems, or in other instances where unusually sharp curves are encountered.

As shown, the subframe 320 of Figure 11 comprises the three telescopically related portions 322, 324, and 326. The central section 324, which may correspond to the previously described section 282, is connected to the vehicle body by links 292, and is provided with elevating mechanism comprising the cables 295. The end sections carry and are in part formed by the axles 328 associated with the pilot wheels.

The end sections 322 and 326 are each provided with laterally spaced pairs of forwardly projecting adjustable arms 330, illustrated as being of rectangular or box section. Adjacent their outer ends, arms 330 are formed to define bearing bosses 332, which receive pins 334. Pins 334 serve to pivotally connect the socket carrying arms 336 to the arms 330. Arms 336 are received within the bodies of the arms 330 and are adjustable with respect to the latter by means of adjusting studs 338, which are threadably associated with arms 330 and the upper ends whereof have a free bearing relation against the under sides of arms 336. As described accordingly, arms 330 and 336 have a limited lost motion connection, the function and purpose of which will be apparent from the description of Figures 1 through 8. This lost motion connection may be used to supplement, or in lieu of, lost motion connections between the axles 26 and 28 and the arms 336. If desired, all lost motion may be provided at the latter point by threadably connecting the studs 338 to the arms 336. It will be understood that the illustrated lost motion between arms 336 and 330 is limited by the engagement of the upper sides of arms 336 with the top portions 340 of arms 330.

The arms 336 carry generally horizontally disposed U-shaped sockets 342 which embrace adapting brackets 344 carried by the axles 26 and 28 in the manner described in connection with Figure 9. That is to say, these sockets cooperate with the brackets to maintain the main and pilot wheels in alignment and also afford driving connections between the main axles and the pilot structure. Sockets 342 also accommodate the aforementioned "breathing" of the main axles.

The operation of Figure 11 will be recognized as being functionally the same as that of Figure 9. Further, it will be recognized that the pilot structure may be disconnected from the main suspension by releasing the studs 286, telescoping the subframe sections together sufficiently to cause the sockets to clear the main axles and thereafter actuating the cables 295 to elevate the entire pilot structure to a position in which it affords adequate road clearance. Further, it will be apparent this pilot structure can be completely removed, as in the case of Figure 9.

The embodiment of Figure 12 is generically the same as that of Figure 11 with the exception that the pilot structure is illustrated as comprising only a single pair of laterally spaced pilot wheels 40, which is disposed between and serves to guide two pairs of main roadwheels 24 which may form, for example, the tandem road wheels of a conventional six-wheel vehicle.

The subframe structure comprises three parts, consisting of a central section 350 and end sections 352 which are telescopically received in the central section and may be secured together in desired positions of adjustment of studs 286. The central section 350 carries the pilot wheels and the axle 354, which are provided with mounting members 356. As before, the subframe is a generally rectangular structure, the members 350 and 352 being arranged in identical pairs at opposite sides of the vehicle. The mounting members 356, being carried by the respective sides of the subframe, engage the pilot axle 354 immediately adjacent the ends thereof, as in the previous embodiments.

In Figure 12 the adjustment of the load on the pilot wheels is accomplished by adjusting the members 356 relative to the subframe section 350, a simple wedge adjustment being illustrated.

As to operation on the rails and on the roadway, as well as to conversion from one type of travel to another, the embodiment of Figure 12 functions as described in connection with Figure 11.

The above described sockets and attaching brackets, which mutually embrace each other so as to align the main and pilot wheels, afford driving connections between the pilot structure and the vehicle, permit "breathing" between the main axles in case such "breathing" is required, and afford lost motion connections between the pilot structure and the main suspension, will be recognized as affording very simple economically manufactured and readily applied means for providing the just-mentioned features. As is mentioned above, although these sockets and brackets are illustrated as being relatively rotatable, so that pilot loadings do not apply overturning couples to the main axles, non-rotative connections may be utilized as desired. It will also be appreciated that the individual socket constructions may be used relatively interchangeably. That is to say, the structure of Figure 9 may, if desired, employ any of the other disclosed socket constructions. Similar comments apply to the other embodiments.

Although only several specific embodiments of the invention have been described in detail, it will be appreciated that various further modifications in the form, number and arrangement of the parts may be made without departing from the spirit and scope of the invention.

What is claimed is:

1. Pilot structure for use in adapting a road vehicle for rail travel, said vehicle having a load sustaining body, a main wheel assembly capable of supporting the vehicle for road travel and including a pair of laterally spaced roadwheels having pneumatic tires, and resilient suspension means forming a suspension between said roadwheels and said body, said pilot structure including a pair of laterally spaced pilot wheels adapted to run upon rails in tandem with and corresponding respectively to said roadwheels, an axle for supporting said pilot wheels, and means, materially stiffer than said suspension, acting against said pilot axle at points adjacent the respective ends thereof for connecting the pilot structure to said vehicle only through said resilient suspension and for transferring at least a portion of the vehicle load through said resilient suspension means to said pilot wheels, said means further including lost motion means affording a limited and substantially free one-way connection which enables a substantial but limited relative vertical movement between a pilot wheel and its corresponding roadwheel, and giving a substantially rigid load transmitting connection at the end of lost motion travel, said lost motion being sufficient in extent to insure that reductions in tire deflection occasioned in rounding a turn shall not cause said pilot wheels to be raised away from the rails.

2. In a combined road and rail vehicle, a load sustaining body, a main wheel assembly capable of supporting the vehicle for road travel and including a pair of laterally spaced pneumatically tired roadwheels, resilient suspension means forming a suspension between said roadwheels and said body, structure for guiding the vehicle during travel upon rails, said structure including a pair of laterally spaced pilot wheels adapted to run upon rails and corresponding respectively to said roadwheels, an axle for supporting said pilot wheels, and means acting against said pilot axle at points adjacent the respective ends thereof for transferring at least a portion of the vehicle load through said suspension means to said pilot wheels, said structure further including means affording a limited and substantially free one-way connection which enables limited relative vertical movement between a pilot wheel and its corresponding roadwheel, said roadwheels and said pilot structure including resilient means respectively, whereby the vehicle load is divided between said pilot wheels and said roadwheels in accordance with the relative spring rates of said resilient means, and means to retract said pilot wheels and carry them in inoperative raised position independent of said resilient suspension.

3. In a combined road and rail vehicle, a load sustaining body, a main wheel assembly capable of supporting the vehicle for road travel and including a pair of laterally spaced pneumatically tired roadwheels, resilient suspension means forming a suspension between said roadwheels and said body, structure for guiding the vehicle during travel upon rails, said structure including a pair of laterally spaced pilot wheels adapted to run upon rails and corresponding respectively to said roadwheels, an axle for supporting said pilot wheels, and means acting against said pilot axle at points adjacent the respective ends thereof for transferring at least a portion of the vehicle load through said suspension means to said pilot wheels, said structure further including means affording a limited and substantially free one-way connection which enables limited relative vertical movement between a pilot wheel and its corresponding roadwheel, said roadwheels and said pilot structure including resilient means respectively, whereby the vehicle load is divided between said pilot wheels and said roadwheels in accordance with the relative spring rates of said resilient means, and means to raise said pilot wheels and support them in raised position from the vehicle body.

4. In a vehicle, a body structure, means adapting the vehicle for road or rail travel including at least two relatively fore and aft pairs of laterally spaced pneumatically tired roadwheels adapted to run either on rails or on a roadway, axle means for said roadwheels, means forming a resilient suspension between said axle means and said body, pilot structure for guiding the vehicle during rail travel and including at least one pair of pilot wheels and an axle therefor, said pilot wheels being adapted to run upon rails in tandem with said roadwheels, mounting means for said pilot wheels, said mounting means including subframe means supportingly connected between the axle means for at least said two pairs of said roadwheels and connecting means operatively connected from said subframe to the pilot axle at spaced points adjacent its ends for directly transferring load to said pilot wheels so that during normal rail travel said road and pilot wheels divide the vehicle load, said mounting means being so stiff that its total spring rate is at least as great as that of said pneumatic tires whereby increases in tire deflection of a roadwheel at one side of the vehicle due to increased load, as in rounding a turn, necessarily result in at least one-half of said increased load being transmitted directly to a pilot wheel on the same side of the vehicle.

5. A vehicle adapted for operation on the highway or on railroad tracks and comprising, in combination, a vehicle body, longitudinally spaced apart pairs of laterally spaced resilient suspensions therefor, front and rear pairs of pneumatic tired roadwheels carried thereby, rail guiding means including an axle carrying a pair of flanged pilot wheels to operate on the rails in tandem with said roadwheels, two laterally spaced and longitudinally extending frame means operatively connected to said pilot axle adjacent its ends and to said two pairs of laterally spaced resilient suspensions to apply a predetermined portion of the vehicle load to said pilot wheels in normal rail operation and when the vehicle is rounding a turn on the rails to transfer additional load only through said resilient suspension means through said frame means predominantly to that end of the pilot axle which is on the outside of the turn, said additional load resulting from increased deflections of the tires of the roadwheels on the outside of the turn.

6. A vehicle adapted for operation on the highway or on railroad tracks and comprising, in combination, a vehicle body, pairs of laterally spaced apart resilient suspensions longitudinally spaced and shifting longitudinally relative to each other upon vertical deflections, pairs of pneumatic tired roadwheels carried thereby, rail guiding means including an axle carrying a pair of flanged pilot wheels to operate on the rails in tandem with said roadwheels, two laterally spaced and longitudinally extending frame means operatively connected to said pilot axle adjacent its ends and to said two pairs of laterally spaced resilient suspensions to resist relative lateral displacement of said pilot axle and apply a predetermined portion of the vehicle load to said pilot wheels in normal rail operation and when the vehicle is rounding a turn on the rails to transfer additional load from said resilient suspension means through said frame means predominantly to that end of the pilot axle which is on the outside of the turn, said additional load resulting from increased deflections of the tires of the roadwheels on the outside of the turn, said frame means and its connections including a limited longitudinal lost motion to permit said shifting.

7. A vehicle as defined in claim 4 wherein said suspension means enables the main axle means associated with different pairs of roadwheels to have limited relative movement lengthwise of the vehicle and wherein said mounting means include means adapting it to accommodate such relative movement.

8. A vehicle as defined in claim 4 wherein said pilot structure includes only a single pair of pilot wheels positioned between said main axle means, and said two pairs of roadwheels being closely spaced longitudinally as in the rear of a six-wheel vehicle.

9. A vehicle as defined in claim 4 wherein said pilot structure includes two pairs of such pilot wheels and axles therefor positioned ahead and behind the front and rear roadwheels respectively.

10. A pilot structure for use in adapting a road vehicle for rail travel, said vehicle having a load sustaining body structure, means adapting the vehicle for road travel including at least two relatively fore and aft pairs of laterally spaced pneumatically tired roadwheels and axle means therefor, and means forming a resilient suspension between said first mentioned means and said body, said pilot structure including at least one pair of flanged pilot wheels and an axle therefor, said pilot wheels being adapted to run upon rails in tandem with and guide said roadwheels, mounting means for said pilot wheels, said mounting means including sub-frame members extending between and supported by the axle means for at least two pairs of said roadwheels, and means operatively connected to the pilot axle at spaced points adjacent its ends for transferring vehicle load through said mounting means and said resilient suspension to said pilot wheels so that during normal rail travel said road and pilot wheels divide the vehicle load, said mounting means being so stiff that its total spring rate is at least as great as that of said pneumatic tires whereby increases in tire deflection of a roadwheel at one side of the vehicle due to increased load, as in rounding a turn, necessarily result in at least one-half of said increased load being transmitted directly to a pilot wheel on the same side of the vehicle.

11. For use with a road vehicle having longitudinally spaced front and rear pairs of pneumatically tired roadwheels laterally spaced to also run on rails and having laterally spaced resilient suspension means for each of said roadwheels; as an article of manufacture an appliance to adapt such a road vehicle for operation on rails with the major portion of its load normally carried by its roadwheels, comprising in combination, rail guiding and load carrying pilot wheels for operation on the rails in tandem with said roadwheels to normally carry a predetermined portion of the vehicle load, subframe means supporting and directly loading said pilot wheels and positioning them against lateral displacements relative to said roadwheels, said sub-frame having a length at least substantially equal to the road vehicle wheel-base and having connecting means adjacent its ends to connect it to the moving ends of the suspension means for each of said pairs of front and rear roadwheels and so that changes in relative loading of roadwheels at opposite sides of the vehicle cause corresponding relative changes in the loading of said pilot wheels, said connecting means transmitting vehicle load from the resilient suspension to the subframe means.

12. The organization as defined in claim 11 including at least one pair of laterally spaced pilot wheels having an axle therebetween, said axle being connected to and loaded from the sub-frame at spaced points adjacent its ends.

13. For use in a road vehicle having a body and a set of longitudinally spaced pairs of pneumatically tired roadwheels laterally spaced to also run on rails, and with axle means and resilient suspension means therefor; as an article of manufacture an appliance to adapt such a road vehicle for operation on the rails with the traction and the major load through the roadwheels comprising, in combination, rail guiding means including a set of laterally spaced flanged, rail engaging pilot wheels to run in tandem with said roadwheels on the rails, a subframe to position and support said pilot wheels with a predetermined load therein in normal operation and extending between and having means to operatively connect it to each of two longitudinally spaced pairs of wheels of one of said two sets of wheels, and means to withdraw said pilot wheels from operative position on the rails including at least two relatively longitudinally movable parts in said subframe associated respectively with said connections to each of said longitudinally spaced wheels.

14. The structure of claim 13 wherein the two longitudinally movable parts of the subframe are separable from each other to permit ready removal or installation of the thus divided subframe.

15. The structure of claim 13 wherein the two longitudinally movable parts of the subframe are relatively adjustable to accommodate the subframe to vehicles of different axle spacings or wheelbases.

16. The structure of claim 13 including means to raise said subframe to an inoperative position in which the pilot wheels are held out of cooperative relation with the rails and wherein said longitudinally movable parts by their said movement enable said raising.

17. The structure of claim 13 wherein each said part carries at least one pair of said rail engaging pilot wheels.

18. As an article of manufacture for use in adapting a road vehicle to run upon rails, said vehicle having at least a pair of pneumatically tired roadwheels and an axle extending therebetween, a pilot structure connecting member having portions adapting it for securement to said axle and also having surfaces spaced lengthwise of the axle and facing generally lengthwise of the vehicle, said surfaces being adapted to cooperate with said pilot structure and provide a connection between such structure and said axle which enables pivotal movement between the said axle and said pilot structure and enables bodily movement therebetween lengthwise of the vehicle but limits relative lateral motion between the pilot structure and said axle.

19. The structure of claim 18, wherein said member is shaped to enable a relative fork-like embracing relation between it and said structure.

20. As an article of manufacture for use in adapting a road vehicle to run upon rails, said vehicle having at least a pair of pneumatically tired roadwheels and an axle therebetween; a rail guiding pilot mechanism to be detachably connected to said road vehicle and including means to removably engage correspondingly shaped means on the road vehicle axle to prevent lateral displacements therebetween, to relatively embrace upon a relative longitudinal motion therebetween, and to permit relative pivotal and longitudinal bodily movements.

21. The structure of claim 20 including means to vertically adjust said means to accommodate different axle heights.

22. In a combined road and rail vehicle, a body, means adapting the vehicle for road travel comprising a plurality of pairs of pneumatically tired roadwheels, resilient means forming a suspension between said wheels and said body, pilot structure including at least a pair of pilot wheels adapted to run upon rails and guide the roadwheels on such rails in tandem therewith, means connected to the vehicle body only through said suspension for transferring a predetermined portion of the vehicle load to the pilot wheels, and means carried by the vehicle body for retracting said pilot wheels out of cooperative relation to the rails and for supporting at least the major portion of the weight of the pilot structure directly from the body.

23. A pilot structure for use in adapting a road vehicle for rail travel, said vehicle having a body, means adapting it for road travel comprising a plurality of pairs of pneumatically tired roadwheels, and resilient means forming a suspension between said wheels and said body, said pilot structure including at least a pair of pilot wheels adapted to run upon rails and guide the roadwheels on such rails in tandem therewith, means connected to the vehicle body only through said suspension for transferring a predetermined portion of the vehicle load to the pilot wheels, and means carried by the vehicle body for retracting said pilot wheels out of cooperative relation to the rails and for supporting at least the major portion of the weight of the pilot structure directly from the body.

24. In a combined road and rail vehicle, a body, means adapting the vehicle for road travel comprising a plurality of pairs of pneumatically tired roadwheels, resilient means forming a suspension between said wheels and said body, pilot structure including at least a pair of pilot wheels adapted to run upon rails and guide the roadwheels on such rails in tandem therewith, means connected to the vehicle body only through said suspension for transferring a predetermined portion of the vehicle load to the pilot wheels, and additional means for retracting said pilot wheels to a position out of cooperative relation to the rails.

25. A vehicle adapted for operation on the highway or on railroad tracks and comprising, in combination, a vehicle body, longitudinally spaced apart pairs of laterally spaced resilient suspensions therefor, pairs of pneumatic tired roadwheels on axles carried thereby, rail guiding means including flanged pilot wheels to operate on the rails in tandem and to share the load with said roadwheels, two laterally spaced and longitudinally extending side-frame members operatively connected to support each said pilot wheel on the frame member at a point closely adjacent to said pilot wheel and also operatively connected to and between said two pairs of laterally spaced resilient suspensions so as to resist lateral displacements of said pilot wheels and their supporting frame members so as to carry a predetermined portion of the vehicle load on said pilot wheels in normal rail operation and when the vehicle is rounding a turn on the rails to transfer additional load from said resilient suspension means through said frame means predominantly to the pilot wheel on the outside of the curve, and so as to form a subframe including said axles, said subframe being relatively rigid in resisting relative tilting of said axles or of said side frame members.

26. In a combined road and rail vehicle, a body structure, means adapting the vehicle for road travel including at least two pairs of laterally spaced pneumatically tired roadwheels, and axles means therefor, means forming a resilient suspension between said first mentioned means and said body, pilot structure for guiding the vehicle during rail travel and including at least one pair of pilot wheels and an axle therefor, said pilot wheels being adapted to run upon rails in tandem with said roadwheels, mounting means for said pilot wheels, said mounting means including relatively rigid side frame members extending between, and supported by the axle means for at least two pairs of said road wheels so that said side frame members with said axles form a rectangular subframe resisting relative tilting of said axles or of said side frame members, and means operatively connected to the pilot axle at spaced points adjacent its ends for directly transferring load from through said mounting means to said pilot wheels so that during normal rail travel said road and pilot wheels divide the vehicle load, said mounting means being so stiff that its total spring rate is at least as great as that of said pneumatic tires whereby increases in tire deflection, of a roadwheel at one side of the vehicle due to increased load, as in rounding a turn, necessarily result in at least one-half of said increased load being transmitted directly to a pilot wheel on the same side of the vehicle.

27. The organization of claim 26 in which there are means to disconnect said side frame members from said main axles and to raise said side frame members with said pilot wheels to an inoperative position for operation on the highway.

28. In a combined road and rail vehicle, a body structure, a set of at least two longitudinally spaced pairs of resilient road wheels laterally spaced to also run on the rails, resilient suspension means between said roadwheels and said body structure, a set of at least one pair of rail guiding pilot wheels to run on the rails in load sharing tandem with the roadwheels, and mounting means for said pilot wheels to support them and to apply vehicle load to them from said suspension means, said vehicle and said mounting means including retraction means to move said pilot wheels and their said mounting means to a raised inoperative position for road travel supported by said body structure.

29. As a removable appliance to adapt for selective rail or road travel a road vehicle having at least two longitudinally spaced pairs of resilient roadwheels laterally spaced to also run on the rails and having softer resilient suspension means therefor, said appliance comprising a set of at least one pair of rail guiding and load carrying pilot wheels to run on the rails in load sharing tandem with said roadwheels, and mounting and supporting means for said pilot wheels to transmit load to said pilots from said resilient suspension and including frame means and means to detachably engage the resilient suspension means for two longitudinally spaced pairs of roadwheels to normally transmit a predetermined vehicle body load to said pilot wheels.

30. In a combined road and rail vehicle, a load sustaining body, a main wheel assembly capable of supporting the vehicle for road travel and including a pair of laterally spaced roadwheels having pneumatic tires, suspension means forming a resilient suspension between said roadwheels and said body, structure for guiding the vehicle during travel upon rails, said structure including a pair of laterally spaced pilot wheels adapted to run upon rails in tandem with, and corresponding respectively to said roadwheels, an axle for supporting said pilot wheels, and means materially stiffer than said suspension, acting against said pilot axle at points adjacent the respective ends thereof for transferring at least a portion of the vehicle load through said resilient suspension means to said pilot wheels, said means further including lost-motion means affording a limited and substantially free one-way connection which enables substantial but limited relative vertical movement between a pilot wheel and its corresponding roadwheel, and giving a substantially rigid load transmitting connection at the end of lost motion travel, said lost motion being sufficient in extent to insure that reductions in tire deflection occasioned in rounding a turn shall not cause said pilot wheels to be raised away from the rails.

31. The structure of claim 30 in which said pilot wheels are connected to the body only through the resilient suspension during normal rail operation.

WILLIAM S. WATTS.
LOUIS G. CARMICK, JR.

REFERENCES CITED

The following references are of record in the file of this patent:

UNITED STATES PATENTS

| Number | Name | Date |
|---|---|---|
| 1,446,784 | Carter | Feb. 27, 1923 |
| 1,716,005 | Ridley | June 4, 1929 |
| 1,801,469 | Wagner | Apr. 21, 1931 |
| 2,116,797 | Nampa | May 10, 1938 |
| 2,140,421 | Fageol | Dec. 13, 1938 |
| 2,478,647 | Watts et al. | Aug. 9, 1949 |